(12) United States Patent
Hashiguchi

(10) Patent No.: US 8,798,370 B2
(45) Date of Patent: Aug. 5, 2014

(54) PATTERN IDENTIFYING APPARATUS, PATTERN IDENTIFYING METHOD AND PROGRAM

(75) Inventor: Noriyasu Hashiguchi, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 154 days.

(21) Appl. No.: 13/604,009

(22) Filed: Sep. 5, 2012

(65) Prior Publication Data

US 2013/0236103 A1    Sep. 12, 2013

(30) Foreign Application Priority Data

Sep. 12, 2011    (JP) ................................. 2011-198692

(51) Int. Cl.
*G06K 9/46* (2006.01)
(52) U.S. Cl.
USPC ......................................................... 382/192
(58) Field of Classification Search
None
See application file for complete search history.

(56) References Cited

U.S. PATENT DOCUMENTS

| 2006/0177131 | A1* | 8/2006 | Porikli | 382/168 |
| 2009/0317014 | A1* | 12/2009 | Porikli | 382/261 |
| 2010/0180189 | A1* | 7/2010 | Ito et al. | 715/219 |

FOREIGN PATENT DOCUMENTS

| JP | 2008-102792 A | 5/2008 |
| JP | 2008-299627 A | 12/2008 |

OTHER PUBLICATIONS

Porikli, "Integral histogram: A fast way to extract histograms in Cartesian spaces," Proc. IEEE Conf. on Computer Vision and Pattern Recognition, vol. 1., pp. 829-836, Jun. 20-26, 2005, San Diego, CA, USA.*
Adam et al., "Robust Fragments-Based Tracking Using Integral Histogram." In Proc. IEEE Conf. on Comp. Vision and Patt. Recog., pp. 2142-2147, 2006.*
F.C. Crow, "Summed-Area Tables for Texture Mapping", Computer Graphics, 1984.
P. Viola et al., "Rapid Object Detection using a Boosted Cascade of Simple Features", Proc. IEEE Conf. on Computer Vision and Pattern Recognition, vol. 1, pp. 511-518, Dec. 2001.
S. Yan et al., "Locally assembled binary (lab) feature with feature-centric cascade for fast and accurate face detection." 26th IEEE Conference on Computer Vision and Pattern Recognition, CVPR, 2008.

* cited by examiner

*Primary Examiner* — Bhavesh Mehta
*Assistant Examiner* — Feng Niu
(74) *Attorney, Agent, or Firm* — Carter, DeLuca, Farrell & Schmidt, LLP

(57) ABSTRACT

A pattern identifying apparatus comprises: a generating unit to generate, from input data corresponding to an area, accumulated information corresponding to each position in the area; plural storing units to hold the accumulated information for each dimension; a writing unit to write the accumulated information corresponding to each position to one of the plural storing units according to a predetermined rule concerning the corresponding position; a parallel reading unit to read the accumulated information in parallel from the plural storing units; a feature quantity calculating unit to calculate a feature quantity of a local area by using the read accumulated information; and an identifying unit to identify a predetermined pattern by using the plural feature quantities. The number of the storing units allocated to at least one dimension of the area corresponding to the input data and a reading interval of the accumulated information are in a coprime relation.

10 Claims, 13 Drawing Sheets

ACCUMULATED IMAGE INFORMATION
AND 16-POINT READING
(NUMERICAL VALUES IN PIXELS = COORDINATES)

ACCUMULATED IMAGE INFORMATION AND
16-POINT READING DESTINATION MEMORIES
(NUMERICAL VALUES IN PIXELS = MEMORIES
OF ALLOCATION DESTINATIONS)

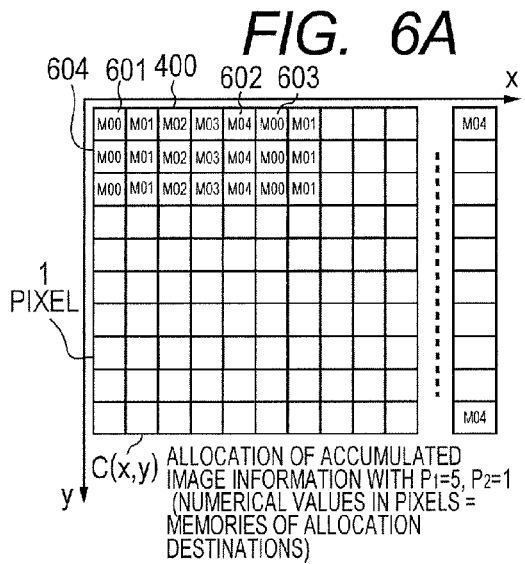

FIG. 6A

ALLOCATION OF ACCUMULATED IMAGE INFORMATION WITH $P_1=5$, $P_2=1$ (NUMERICAL VALUES IN PIXELS = MEMORIES OF ALLOCATION DESTINATIONS)

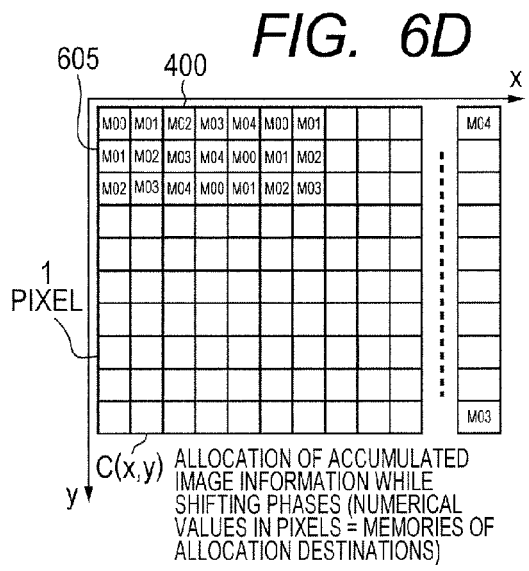

FIG. 6D

ALLOCATION OF ACCUMULATED IMAGE INFORMATION WHILE SHIFTING PHASES (NUMERICAL VALUES IN PIXELS = MEMORIES OF ALLOCATION DESTINATIONS)

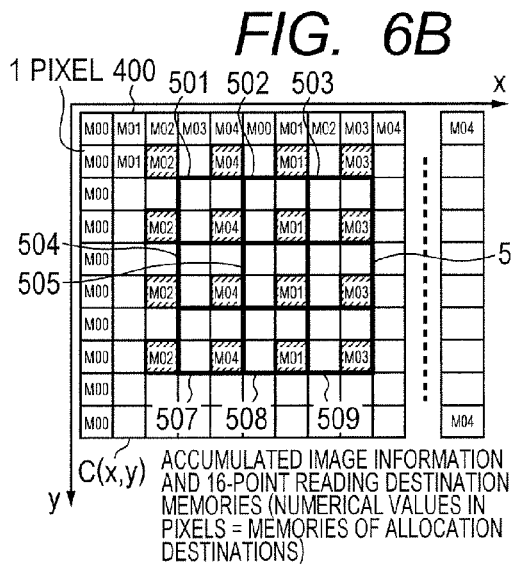

FIG. 6B

ACCUMULATED IMAGE INFORMATION AND 16-POINT READING DESTINATION MEMORIES (NUMERICAL VALUES IN PIXELS = MEMORIES OF ALLOCATION DESTINATIONS)

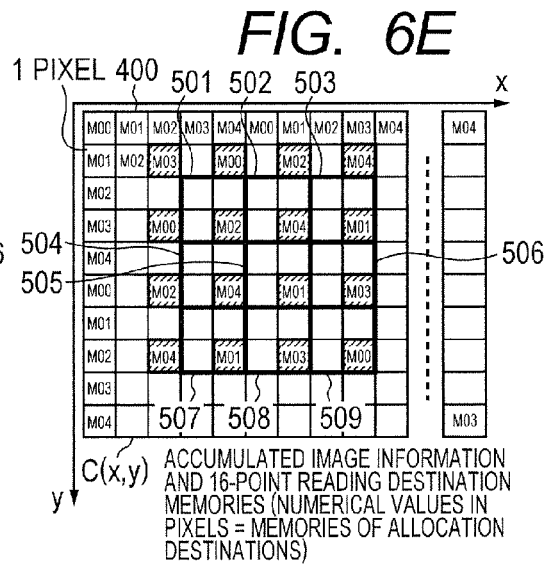

FIG. 6E

ACCUMULATED IMAGE INFORMATION AND 16-POINT READING DESTINATION MEMORIES (NUMERICAL VALUES IN PIXELS = MEMORIES OF ALLOCATION DESTINATIONS)

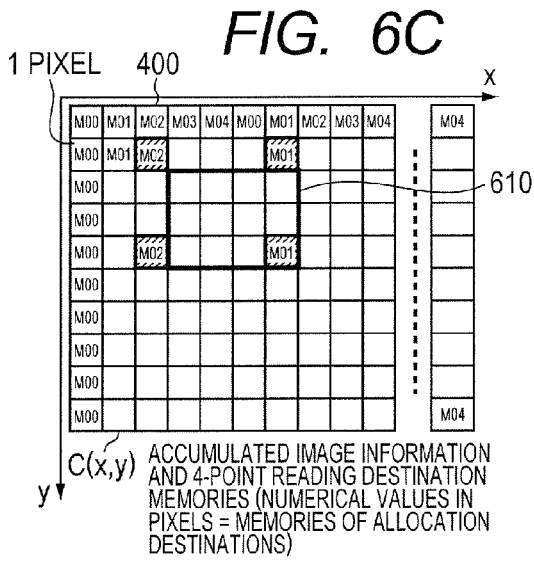

FIG. 6C

ACCUMULATED IMAGE INFORMATION AND 4-POINT READING DESTINATION MEMORIES (NUMERICAL VALUES IN PIXELS = MEMORIES OF ALLOCATION DESTINATIONS)

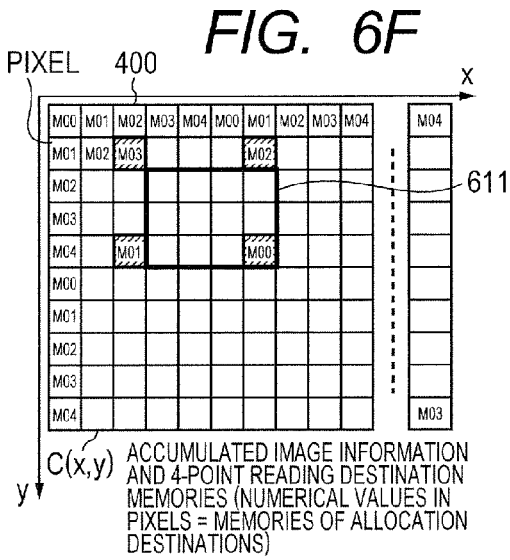

FIG. 6F

ACCUMULATED IMAGE INFORMATION AND 4-POINT READING DESTINATION MEMORIES (NUMERICAL VALUES IN PIXELS = MEMORIES OF ALLOCATION DESTINATIONS)

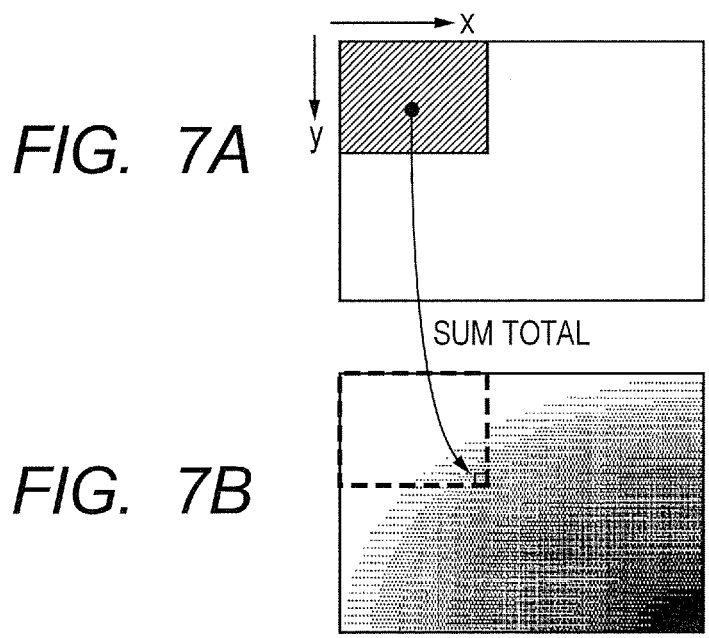
FIG. 7A
FIG. 7B
FIG. 8
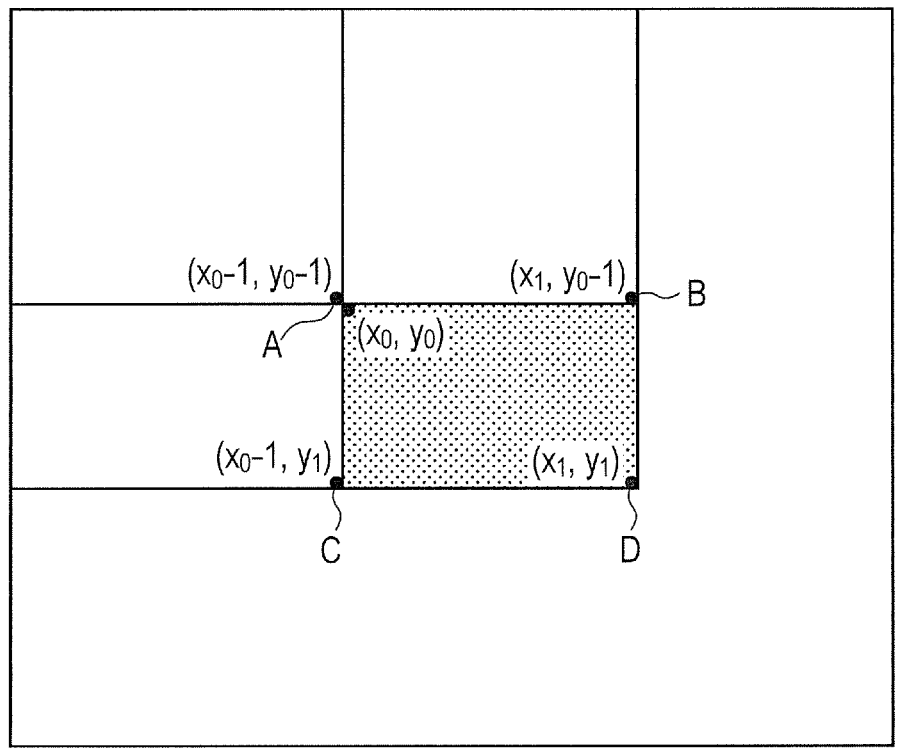

FIG. 15

1701 — WHEN STRIDE = 1

| MEMORY | #1 | #2 | #3 | #4 | #5 |
|---|---|---|---|---|---|
| ADDRESS | 0 | 1 | 2 | 3 | 4 |
| | 5 | 6 | 7 | 8 | 9 |
| | 10 | 11 | 12 | 13 | 14 |

1702 — WHEN STRIDE = 2

| MEMORY | #1 | #2 | #3 | #4 | #5 |
|---|---|---|---|---|---|
| ADDRESS | 0 | 1 | 2 | 3 | 4 |
| | 5 | 6 | 7 | 8 | 9 |
| | 10 | 11 | 12 | 13 | 14 |

1703 — WHEN STRIDE = 3

| MEMORY | #1 | #2 | #3 | #4 | #5 |
|---|---|---|---|---|---|
| ADDRESS | 0 | 1 | 2 | 3 | 4 |
| | 5 | 6 | 7 | 8 | 9 |
| | 10 | 11 | 12 | 13 | 14 |

1704 — WHEN STRIDE = 4

| MEMORY | #1 | #2 | #3 | #4 | #5 |
|---|---|---|---|---|---|
| ADDRESS | 0 | 1 | 2 | 3 | 4 |
| | 5 | 6 | 7 | 8 | 9 |
| | 10 | 11 | 12 | 13 | 14 |
| | 15 | 16 | 17 | 18 | 19 |

1705 — WHEN STRIDE = 5

| MEMORY | #1 | #2 | #3 | #4 | #5 |
|---|---|---|---|---|---|
| ADDRESS | 0 | 1 | 2 | 3 | 4 |
| | 5 | 6 | 7 | 8 | 9 |
| | 10 | 11 | 12 | 13 | 14 |
| | 15 | 16 | 17 | 18 | 19 |
| | 20 | 21 | 22 | 23 | 24 |

1706 — WHEN STRIDE = 6

| MEMORY | #1 | #2 | #3 | #4 | #5 |
|---|---|---|---|---|---|
| ADDRESS | 0 | 1 | 2 | 3 | 4 |
| | 5 | 6 | 7 | 8 | 9 |
| | 10 | 11 | 12 | 13 | 14 |
| | 15 | 16 | 17 | 18 | 19 |
| | 20 | 21 | 22 | 23 | 24 |

1707 — WHEN STRIDE = 7

| MEMORY | #1 | #2 | #3 | #4 | #5 |
|---|---|---|---|---|---|
| ADDRESS | 0 | 1 | 2 | 3 | 4 |
| | 5 | 6 | 7 | 8 | 9 |
| | 10 | 11 | 12 | 13 | 14 |
| | 15 | 16 | 17 | 18 | 19 |
| | 20 | 21 | 22 | 23 | 24 |
| | 25 | 26 | 27 | 28 | 29 |

PATTERN IDENTIFYING APPARATUS, PATTERN IDENTIFYING METHOD AND PROGRAM

BACKGROUND OF THE INVENTION

1. Field of the Invention

The present invention relates to a pattern identifying apparatus and a pattern identifying method which use, for example, accumulated information, and a program for causing a computer to perform the pattern identifying method.

2. Description of the Related Art

In the information processing field, multidimensional arrangement information is frequently used. In particular, in an image process, a partial process concerning image recognition, image synthesis or the like, a statistical process and the like, a sum total value of the elements in a specific area is often obtained and used. In the field of computer graphics, for example, a concept called a rectangular summed-area table concerning accumulated information to original input image information has been proposed (for example, see F. C. Crow, "Summed-Area Tables for Texture Mapping", Computer Graphics, 1984). In this literature, the summed-area table is set to a two-dimensional arrangement having the same size (the same number of elements) as that of the input image, and the pixel value of the coordinates (x, y) of the input image is defined as I(x, y). Then, a component C(x, y) of the same position (x, y) on the summed-area table is defined by the following expression (1).

$$C(x, y) = \sum_{\substack{x' \le x \\ y' \le y}} I(x', y') \quad (1)$$

That is, in FIGS. 7A and 7B, the sum total value of the pixels in the rectangle having the pixels of the origin position (0, 0) and the position (x, y) as the opposing corner in an original input image illustrated in FIG. 7A is equivalent to the value C(x, y) of the position (x, y) on the summed-area table illustrated in FIG. 7B. Incidentally, although the summed-area table originally described in the above literature has the origin position as the lower left of the image, the origin position is hereinafter assumed as the upper left of the image for consistency with the following description.

By the above definitions, it is possible to obtain the sum of I(x, y) in an arbitrary rectangular area set horizontally or vertically on the input image, only by referring to the four points on the summed-area table. For example, as illustrated in FIG. 8, the following expression (2) is used to obtain the sum total $C(x_0, y_0; x_1, y_1)$ of the pixel values in the rectangular area having $(x_0, y_0)$ and $(x_1, y_1)$ as the opposing corner.

$$C(x_0, y_0; x_1, y_1) = C(x_0-1, y_0-1) - C(x_0-1, y_1) - C(x_1, y_0-1) + C(x_1, y_1) \quad (2)$$

Thus, it is possible to obtain at high speed the sum total of the values in the arbitrary rectangular area on the image.

Besides, Japanese Patent Application Laid-Open No. 2008-299627 discloses one of accumulated information implementation methods.

In the field of image recognition, accumulated information which is equivalent to the above summed-area table is called Integral Image, feature quantities are calculated in a plurality of local areas by using the Integral Image, and the pattern recognition is performed based on the calculated feature quantities (for example, see P. Viola, M. Jones, "Rapid Object Detection using a Boosted Cascade of Simple Features", Proc. IEEE Conf. on Computer Vision and Pattern Recognition, Vol. 1, pp. 511-518, December 2001). Here, the "local area" indicates a partial area of the image area cut out from the input image. In the pattern recognition, the feature quantities are calculated in the plurality of local areas, and parameters previously obtained by learning are used for the feature quantities. Here, it should be noted that the parameters include information such as positions, sizes and the like of the local areas for which the feature quantities are calculated.

Further, in the pattern recognition, the number of times of referring to the local areas is very large, and the accumulated information is randomly read for calculating the feature quantities. For example, in a case where the accumulated information is stored in a single-port memory in which one data can be read at a time, readings of four vertexes are serialized and processed by four-time memory accesses. Here, if one cycle is necessary for the one-time memory access, at least four cycles are necessary to obtain one rectangular area. For this reason, in a case where requested detection performance (depending on a frame rate, an image size, the number of detection targets, and the like) is high, there is a possibility that the memory accesses become a bottleneck. Consequently, to achieve the high-performance detection, it is required to be able to process whole or a part of the serialized four-time readings in parallel.

As one method of cutting down such a reading time, there is a method of storing accumulated information in a dual-port memory in which two data can be read at a time, and thus cutting down the reading time. As another method, there is a method of previously writing same accumulated information in four single-port memories, and then reading four vertexes respectively from the four memories in parallel. As yet another method, there is the method of reducing the number of readout times themselves as disclosed in Japanese Patent Application Laid-Open No. 2008-102792.

As yet another method, there is a method of previously writing an integral image in a plurality of storages according to a predetermined rule, and then enabling to read the written images in parallel. In this method, it is possible to read the four vertexes of the integral image in parallel by previously limiting the shape of a local area at the time of learning. Thus, it is possible to eliminate the bottleneck in memory access and achieve an apparatus capable of performing high-speed reading.

Further, there has been proposed a method by which, to improve recognition accuracy, an area to be referred to in a feature quantity calculating process is read with a shape illustrated in FIG. 13 (for example, see S. Yan, S. Shan, X. Chen, and W. Gao. Locally assembled binary (lab) feature with feature-centric cascade for fast and accurate face detection. 26th IEEE Conference on Computer Vision and Pattern Recognition, CVPR, 2008). More specifically, in the reference area illustrated in FIG. 13, blocks 1550 to 1558 respectively having the same width and height are arranged like tiles, and the feature quantity is calculated from the sum total of pixels in each block. That is, it only has to read 16 points of vertexes 1501 to 1516 of each block by using the integral image, and calculate the sum total based on the read points. However, in this case, it is necessary to perform the memory reading four times as much as the conventional four-vertex memory reading of the local area. Further, if the shape of the local area is limited for the purpose of a high-speed process, recognition accuracy may be influenced by such a limitation. Therefore, it is also necessary to reduce the limitation as much as possible in order to improve recognition accuracy.

SUMMARY OF THE INVENTION

According to one aspect of the present invention, there is provided a pattern identifying apparatus which comprises: a generating unit configured to generate, from input data corresponding to an area, accumulated information corresponding to each position in the area; a plurality of storing units configured to hold or store the accumulated information; a writing unit configured to write the accumulated information corresponding to each position to one of the plurality of storing units according to a predetermined rule concerning the corresponding position; a parallel reading unit configured to read the accumulated information in parallel from the plurality of storing units; a feature quantity calculating unit configured to calculate a feature quantity of a local area by using the read accumulated information; and an identifying unit configured to identify a predetermined pattern by using the plurality of feature quantities. In the pattern identifying apparatus, the number of the storing units allocated to at least one dimension of the area corresponding to the input data and a reading interval of the accumulated information are in a coprime relation.

Further features of the present invention will become apparent from the following description of exemplary embodiments with reference to the attached drawings.

BRIEF DESCRIPTION OF THE DRAWINGS

FIGS. 6A, 6B, 6C, 6D, 6E and 6F are diagrams for describing parallel reading according to a second embodiment.

FIGS. 7A and 7B are diagrams for describing a method of generating of accumulated image information in relation to input image information.

FIG. 8 is a diagram for describing the coordinates to be read from the accumulated image information for calculating a sum total.

FIG. 15 is a diagram for describing a relation between the number of memory allocations and strides.

DESCRIPTION OF THE EMBODIMENTS

First Embodiment

Hereinafter, a first embodiment of the present invention will be described with reference to the attached drawings. Incidentally, in the present embodiment, information of a two-dimensional arrangement such as a summed-area table or Integral Image is called accumulated image information. Further, image information of a two-dimensional arrangement (including not only image information such as an RGB image or a grayscale image but also processed image information such as an image processed by a first derivation filter or the like) is assumed as input image information. In the present embodiment, the constitution of a pattern identifying apparatus, a method of allocating the accumulated image information to memories, and parallel reading will be described, and further learning will be described.

Figure 1:
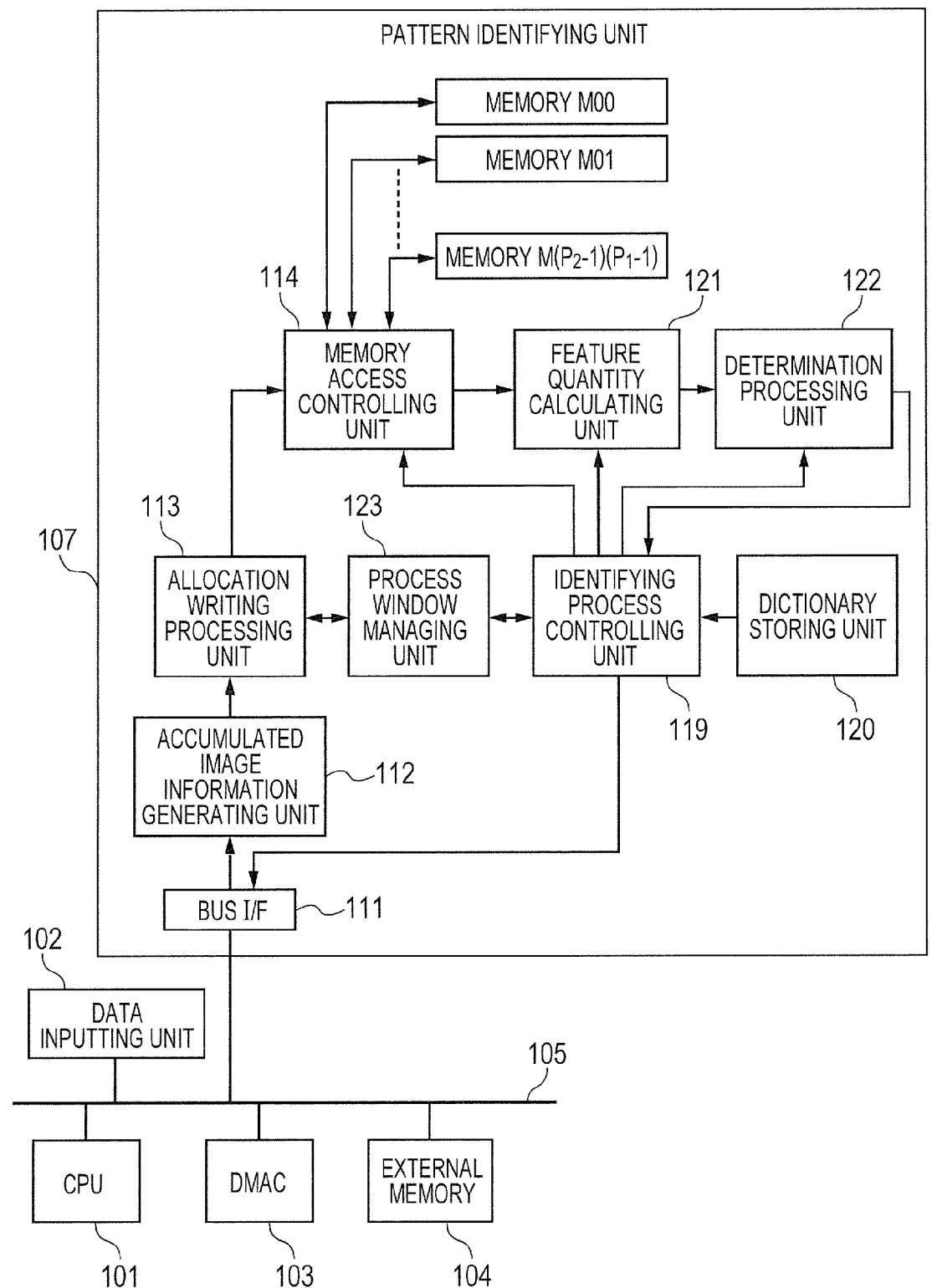
FIG. 1 is a block diagram illustrating an example of the constitution of a pattern identifying apparatus according to an embodiment of the present invention.

FIG. 1 is a block diagram illustrating an example of the constitution of the pattern identifying apparatus according to the present embodiment.

In FIG. 1, a CPU 101 controls each of units respectively connected through a bus 105. A data inputting unit 102 fetches input image information being a process target in the pattern identifying apparatus. Incidentally, the data inputting unit 102 may be constituted by an image sensor such as a CCD or the like, or may be an I/F (interface) apparatus of receiving data intended to be processed from an external device through a predetermined communication path such as a network or the like.

An external memory 104 is constituted by a storing device such as a ROM, a RAM, an HDD (hard disk drive) or the like. More specifically, the external memory 104 is used to store a program code by which the CPU 101 operates, and is also used as a working area which is necessary to perform various processes. Also, the external memory is used as a region for holding input image information, various information to be used for pattern identification, and the like as circumstances demand. A DMAC (direct memory access controller) 103 can autonomously and continuously transfer data of a predetermined size to the data inputting unit 102, the external memory 104 and a pattern identifying unit 107, on the basis of setting and an operation instruction by the CPU 101. When the instructed transfer operation is completed, the DMAC 103 notifies an interruption signal to the CPU 101 through the bus 105.

The pattern identifying unit 107 performs a pattern identifying process to the input image information transferred from the DMAC 103 through the bus 105. More specifically, the pattern identifying unit 107 determines whether or not a predetermined detection pattern (e.g., a face, a human-body standing image, or the like) is detected in the input image information, and then outputs detection information such as a detected position, a detected shape, likelihood and the like. Subsequently, the output detection information is written in the external memory 104 through the bus 105.

The pattern identifying unit 107 includes a bus I/F 111, an accumulated image information generating unit 112, an allocation writing processing unit 113, a memory access controlling unit 114, and memories M00 to $M(P_2-1)(P_1-1)$. Further, the patent identifying unit 107 includes an identifying process controlling unit 119, a dictionary storing unit 120, a feature quantity calculating unit 121, a determination processing unit 122, and a process window managing unit 123.

Figure 14:
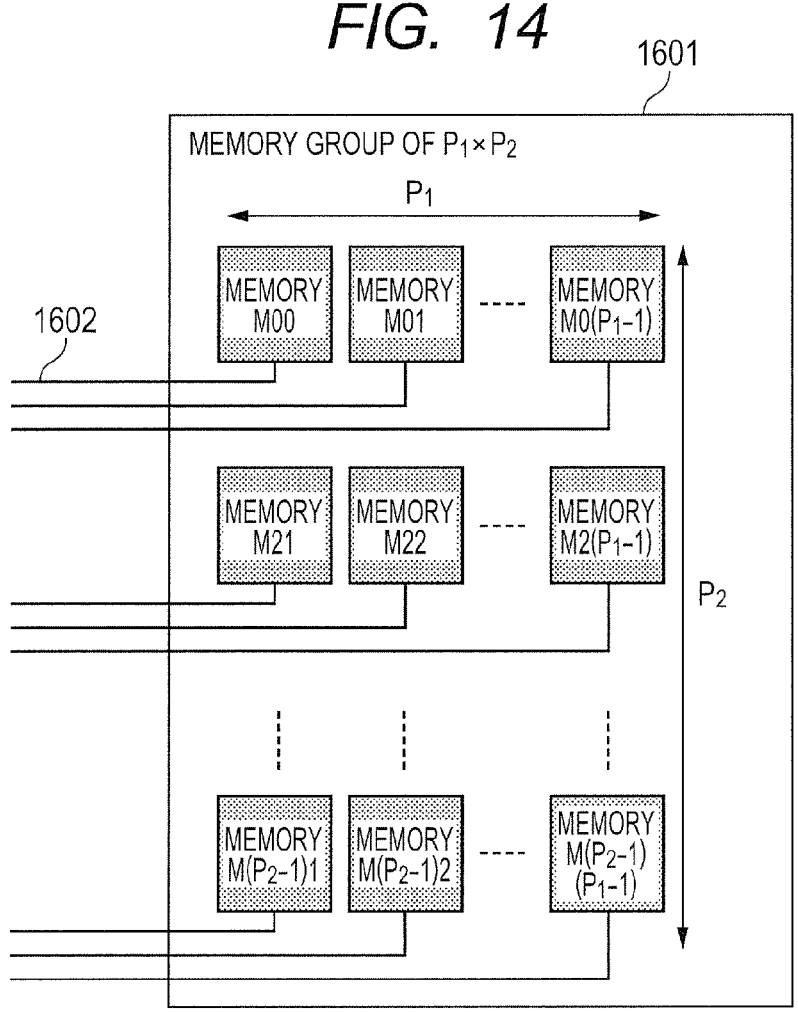
FIG. 14 is a diagram for describing the constitution of a $P_1 \times P_2$ memory group.

In the present embodiment, a single-port memory is used for each of the memories M00 to $M(P_2-1)(P_1-1)$. As illustrated in a memory group 1601 of FIG. 14, these memories are used as the memories of $P_1 \times P_2$ which are allocated two-dimensionally. Here, it should be noted that $P_1$ indicates the number of the memories allocated in the horizontal direction, $P_2$ indicates the number of the memories allocated in the vertical direction, and each of $P_1$ and $P_2$ is "1" or a prime number. In the present embodiment, it is assumed that $P_1=5$, and $P_2=5$. Further, each of memory interfaces 1602 illustrated in FIG. 14 is a single-port memory interface generally used for an address, data or the like. In any case, the memory interface 1602 is provided for each of the memories of $P_1 \times P_2$. Here, data input/output to/from these memories are controlled by the memory access controlling unit 114 through the memory interfaces 1602 respectively.

Figure 2:
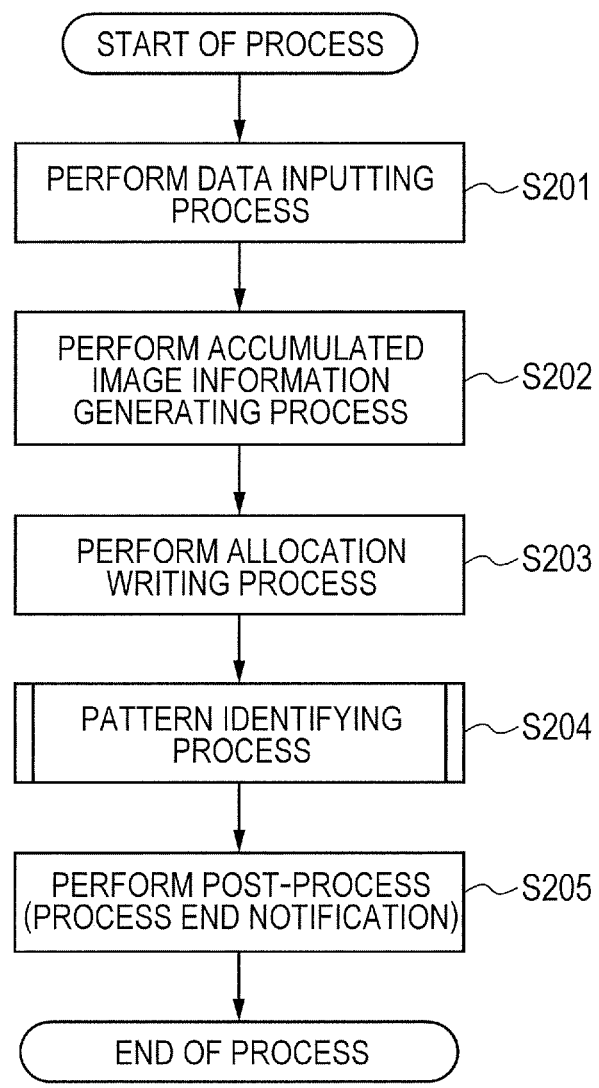
FIG. 2 is a flow chart indicating an example of the procedure in an overall process according to a first embodiment.

Subsequently, the detail and an overall process of the pattern identifying apparatus illustrated in FIG. 1 will be described with reference to FIG. 2.

The pattern identifying apparatus according to the present embodiment initially performs a data inputting process in a step S201 in response to a user's operation or a process start trigger sent from a not-illustrated external device. More specifically, in the step S201, the data inputting unit 102 first receives input image information in response to an instruction of the CPU 101, and accumulates the received input image information in the external memory 104 through the bus 105. Then, the DMAC 103 transfers the input image information accumulated in the external memory 104 to the pattern identifying unit 107. Subsequently, the pattern identifying unit 107 receives the input image information transferred through the bus 105 by the bus I/F 111, and transfers the received input image information to the accumulated image information generating unit 112. It is assumed that, in the present embodiment, the input image information of each pixel is input from the upper left pixel of the image in raster order.

Next, in a step S202, the accumulated image information generating unit 112 accumulates the input image information transferred in raster order, and thus generates the accumulated image information. More specifically, the accumulated image information generating unit 112 accumulates the pixel values while using the upper left pixel of the image in the input image information as an origin, and sequentially transfers the accumulated results to the allocation writing processing unit 113. Incidentally, since the detail of such an accumulating process has already been known in the related art, the explanation thereof will be omitted in the present embodiment.

Next, in a step S203, the allocation writing processing unit 113 performs an allocation writing process to the accumulated image information. More specifically, the allocation writing processing unit 113 first inquires of the process window managing unit 123 whether or not to be able to perform writing to the memory. Here, the process window managing unit 123 manages exclusive controlling of memory writing from the allocation writing processing unit 113 and reading from the identifying process controlling unit 119.

Figure 9:
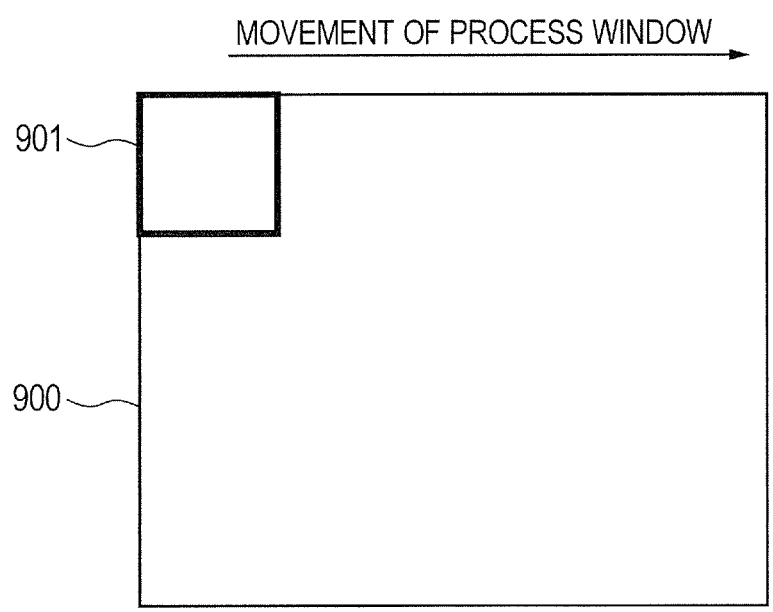
FIG. 9 is a diagram for describing a process window.

Here, it should be noted that a process window is equivalent to a unit area for which the pattern identifying unit 107 performs the process. FIG. 9 is a diagram for describing the process window. More specifically, in input image information 900, an image area of a process window 901 is equivalent to one unit for which the pattern identifying process is performed. Then, the pattern identifying unit 107 performs the pattern identifying process to the process window 901 to determine whether or not a predetermined detection pattern exists in the process window 901. The pattern identifying unit 107 moves in sequence the process window 901 from the upper left of the input image information 900 to the right direction, and performs the pattern identifying process at the respective positions. When the process window 901 reaches the right edge of the input image information, the pattern identifying unit 107 returns the process window to the left edge, and moves the returned process window downward. The pattern identifying unit 107 repeats the above operations to move in sequence the process window to the lower right position of the input image information finally.

The allocation writing processing unit 113 accepts a predetermined number of writing permissions from the process window managing unit 123, determines each of the destination memories M00 to M($P_2-1$)($P_1-1$) and its addresses to which the accumulated image information of each pixel is written, and instructs the memory access controlling unit 114 to perform the writing. The details of the method of determining the memory and its address will be described later as a method of allocating the accumulated information to the memory.

Then, the memory access controlling unit 114 stores the accumulated image information in each of the memories M00 to M($P_2-1$)($P_1-1$) according to the instructed memory and its address. When a predetermined number of writings end, the allocation writing processing unit 113 notifies the process window managing unit 123 of a writing end.

Figure 3:
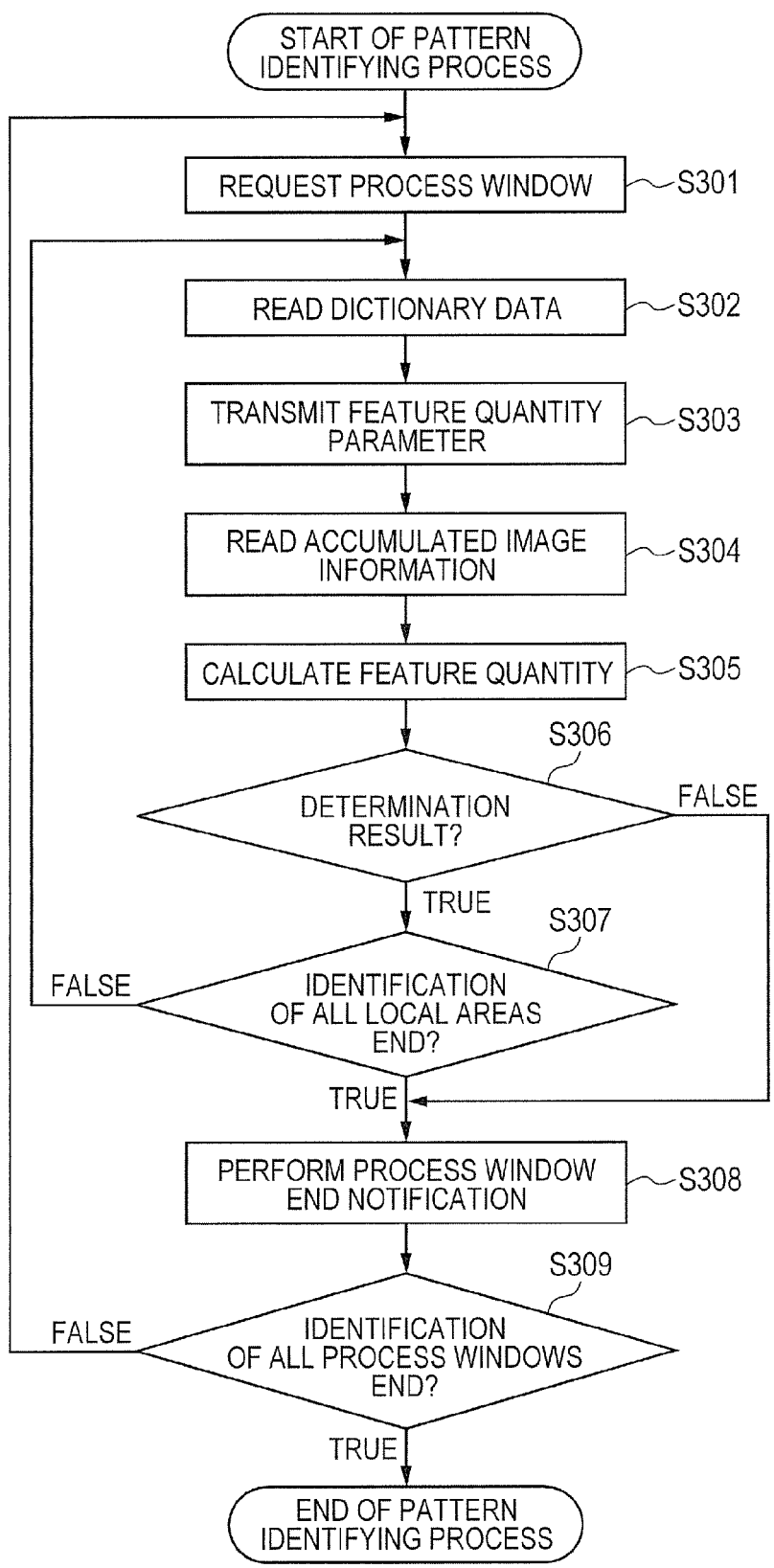
FIG. 3 is a flow chart indicating an example of the procedure in a pattern identifying process according to the first embodiment.

Next, in a step S204, the pattern identifying unit 107 performs the pattern identifying process. Here, the pattern identifying process is performed by using a plurality of such weak discriminators as described in the related background art. Although there are several processing methods in which the weak discriminator is used, a method of first calculating the sum total of local areas in a certain process window and causing the weak discriminator to repeatedly perform determination by using the calculated result several times is used in the present embodiment. In any case, the detail of the pattern identifying process will be described hereinafter with reference to a flow chart illustrated in FIG. 3.

In the pattern identifying process, in a step S301, the identifying process controlling unit 119 first requests, to the process window managing unit 123, the process window to which the process is performed. When the data corresponding to the process window are prepared in the memories M00 to M($P_2-1$) ($P_1-1$), the process is moved to a next step S302.

In the step S302, a process of reading dictionary data is performed. More specifically, the identifying process controlling unit 119 starts the identifying process based on the dictionary data stored in the dictionary storing unit 120. Here, the dictionary data is a parameter group which has been obtained previously by learning. It should be noted that the dictionary data includes parameters such as a position, a size and a shape of the local area in which the features quantity is calculated from the accumulated image information, a coefficient to be used in the determination process, a threshold, and the like.

Next, in a step S303, a process of transmitting the parameters of the feature quantity is performed. More specifically, the identifying process controlling unit 119 calculates the memory numbers and the addresses of the 16 points of the reference area illustrated in FIG. 13 from the parameters of the dictionary data, and instructs the memory access controlling unit 114 to read the accumulated image information. Moreover, the parameters (the coefficient, the threshold, and the like) to be used in the feature quantity calculating unit 121 and the determination processing unit 122 are fetched from the dictionary data, and set to the feature quantity calculating unit 121 and the determination processing unit 122.

Next, in a step S304, a process of reading the accumulated image information is performed. More specifically, the memory access controlling unit 114 reads the data from the memory corresponding to the indicated memory number and its address, and transfers the read data to the feature quantity calculating unit 121. Here, the memory access controlling unit 114 has a function of performing parallel reading in the reading process when the memory numbers are in an exclusive relation. In any case, the detail of the parallel reading will be described later.

Next, in a step S305, the feature quantity calculating unit 121 calculates the sum total value of each block from the read values of the 16 points, and calculates the feature quantity by using the parameters set in the step S303. Then, the calculation result of the feature quantity is transferred to the determination processing unit 122.

Next, in a step S306, the determination processing unit 122 performs result determination by using the calculation result of the feature quantity and the parameter set in the step S303. For example, the parameter to be set is the threshold. Here, it is determined as "TRUE" when the calculation result of the feature quantity is higher than the threshold, while it is determined as "FALSE" when the calculation result of the feature quantity is lower than the threshold. Then, when it is determined as "TRUE", the determination result is transferred to the identifying process controlling unit 119, and the process is moved to a step S307. On the other hand, when it is determined as "FALSE", it is ensured that a predetermined detection pattern is not determined (hereinafter, called "FALSE ensuring"), and the process is moved to a step S308.

Next, in the step S307, it is checked whether or not the identification has ended for all the local areas. When the local area to be processed next remains, the process is returned to the step S302. Thus, the identifying process controlling unit 119 repeatedly performs the processes from the steps S302 to S306 by the number of times corresponding to all the local areas. On the other hand, when it is determined as "TRUE" for all the local areas, it is ensured that the predetermined detection pattern is determined (hereinafter, called "TRUE ensuring"), and the process is moved to the step S308.

Next, in the step S308, a process of performing a process window end notification is performed. More specifically, the identifying process controlling unit 119 notifies the process window managing unit 123 of the end of the process. Then, the process window managing unit 123, which received the notification, starts a process of preparing a next process window. The information indicating the process window of the "TRUE ensuring" is written in the external memory 104 by the identifying process controlling unit 119 through the bus I/F 111. On the other hand, the information indicating the process window of the "FALSE ensuring" is not written in the external memory.

Next, in a step S309, it is checked whether or not the identification has ended for all the process windows. Then, it is determined as "FALSE" when the identification does not end for all the process windows, and the process is performed for a next window. On the other hand, it is determined as "TRUE" when the identification has ended for all the process windows. The above pattern identifying process is repeatedly performed for all the process windows of the input image information. When the process ends for all the process windows, the process is moved to the step S205 in FIG. 2.

Next, in the step S205, a post-process is performed. More specifically, the identifying process controlling unit 119 notifies the CPU 101 that the pattern identifying process has ended for all the process windows. These are the overall process flow of the pattern identifying process.

Next, a method of allocating the accumulated image information to memories, a method of reading data in parallel, and learning will be described. First, the method of allocating the accumulated image information to the memories according to a predetermined rule in the present embodiment will be described. Here, it should be noted that the predetermined rule in the present embodiment is a method of allocating the adjacent pixels to the different memories.

Figure 4:
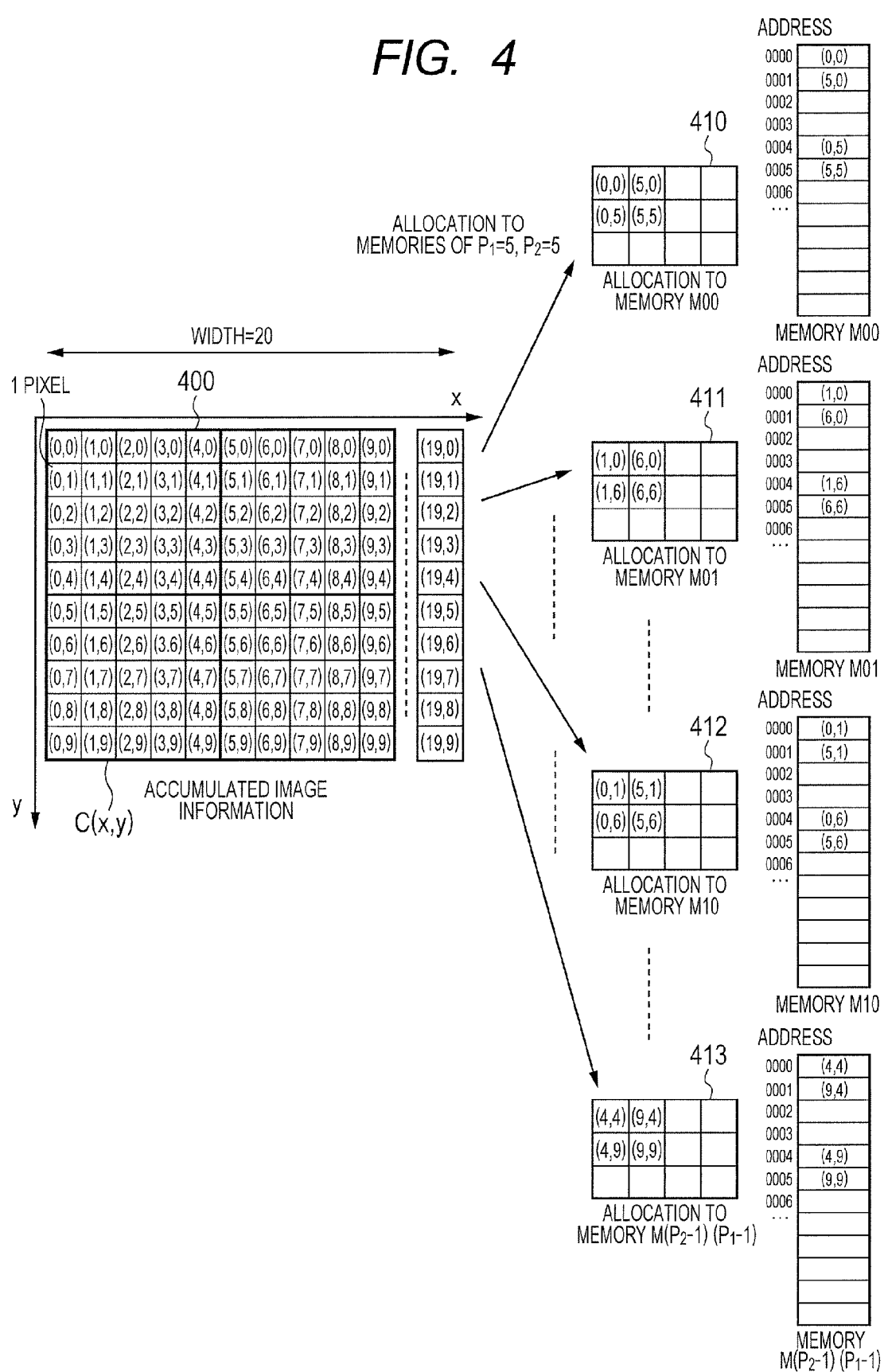
FIG. 4 is a diagram for describing accumulated image information.

FIG. 4 is a diagram for describing accumulated image information 400. In the accumulated image information 400, the upper left is assumed as the origin. Further, the horizontal and vertical directions are respectively indicated by x and y, and the coordinates of each pixel is indicated by (x, y). Here, the coordinates of the origin is equivalent to (0, 0), and one box in the accumulated image information 400 is equivalent to one pixel. In FIG. 4, each of blocks 410 to 413 is equivalent to the arrangement obtained by two-dimensionally representing the arrangement of each memory, and the physical storing image is shown on the right side of the corresponding arrangement. Further, the numerical values described in each memory and the pixel data represented two-dimensionally are equivalent to the corresponding coordinates in the accumulated image information 400.

Subsequently, the predetermined rule in the present embodiment, which has been generalized, will be described. Here, the pixel value of the coordinates (x, y) of the accumulated image information 400 is indicated by C(x, y), and the memories M00 to M($P_2-1$) ($P_1-1$) illustrated in FIG. 14 are allocated as the memories. Further, the number of memories in the x direction is indicated by $P_1$, the number of memories in the y direction is indicated by $P_2$, and each of $P_1$ and $P_2$ is "1" or a prime number.

Further, each memory is indicated by $Mp_2p_1$. Here, $p_1$ and $p_2$ are respectively equivalent to the memory numbers from "0" as the starting point. More specifically, $p_1$ is the memory number in the horizontal direction, and $p_2$ is the memory number in the vertical direction.

The storing destination of C(x, y) is represented by the following expression (3).

$$Mp_2p_1[\text{address}]=C(x,y) \quad (3)$$

Further, the memory numbers $p_1$ and $p_2$ of the memories to which the pixel value of the coordinates (x, y) is stored are respectively represented by the following expressions (4) and (5).

$$p_1 = x \% P_1 \quad (4)$$

$$p_2 = y \% P_2 \quad (5)$$

Here, % indicates a residue (modulo arithmetic).

Further, the coordinates (x', y') on the memory $Mp_2p_1$ are represented by the following expressions (6) and (7).

$$x' = x/P_1 \quad (6)$$

$$y' = y/P_2 \quad (7)$$

Incidentally, in each of x' and y', the value after the decimal point is truncated.

When the width of the image to be stored in the memory $Mp_2p_1$ is defined as m_width, the width m_width can be represented based on the width "width" of the accumulated image information before allocation and the value of $P_1$, by the following expression (8).

$$m\_width = width/P_1 \quad (8)$$

Here, m_width is rounded up.

Further, "address" of the memory $Mp_2p_1$ at the storing destination is represented by the following expression (9).

$$address = m\_width \times y' + x' \quad (9)$$

These are the expressions generalized for allocating the accumulated image information to the memory according to the predetermined rule.

Subsequently, the case where the accumulated image information is allocated to the memories M00 to M($P_2$−1)($P_1$−1) in the present embodiment will be concretely described with reference to FIG. 4. In FIG. 4, it is assumed that the number of allocations in the x direction is 5 ($P_1$=5) and the number of allocations in the y direction is 5 ($P_2$=5). Further, with respect to the width of the image to be stored in the memory $Mp_2p_1$, the width m_width=4 is given from the width=20 and $P_1$=5 of the image of the accumulated image information 400. Based on the above, the accumulated image information 400 of each of the coordinates is allocated.

For example, the storing destination of C(5, 6) is given as $p_1$=0 and $p_2$=1 from the expressions (4) and (5), x'=1 and y'=1 from the expressions (6) and (7), and "address"=5 from the expression (9). As a result, the expression (3) is equivalent to M10[5]=C(5, 6), and the value of C(5, 6) is stored at "address"=5 of the memory M10.

That is the method of allocating the accumulated information to the memory in the present embodiment. In the present embodiment, the accumulated image information is input in the raster order. However, it is important in the present embodiment to allocate and store the accumulated image information to the prime-number memories according to the relation indicated by the expressions (3) to (9). Namely, the present embodiment is not limited by a difference of the input order of the accumulated image information.

Next, a method of reading in parallel the values of the 16 points illustrated in FIG. 13 from the allocated and stored accumulated image information will be described. First, it should be noted that it is necessary for such parallel reading to set the memories from which the reading is performed to be in an exclusive relation. Here, it is important to set an interval (hereinafter, called a stride) of the reading points for each dimension and the number of memories allocated to each dimension to be mutually in a coprime relation. In the present embodiment, the number of memories for each dimension is set to the prime number, and the relation between the number of memories and the stride is set to be relatively prime, because of the reason as described with reference to FIG. 15. In the present embodiment, to simplify the description, only the direction (x axis) of the one-dimensional arrangement is focused.

Initially, a case where data is allocated to five memories and five data are read with a certain stride will be considered. Tables 1701 to 1707 illustrated in FIG. 15 indicate the reading-destination memories in a case where the stride is changed from 1 to 7. The same data have been stored at the same addresses in the memories indicated by the respective tables, and the blacked portions in the tables indicate the reading-destination data. Further, in each table, #1 to #5 on the first row indicate the memory numbers respectively, and the numerical values in the second and subsequent rows indicate the x-coordinate values. For example, the data of x=6 is stored at the address=1 of the memory #2.

Next, the table 1704 of the stride=4 will be described by way of example. If it is assumed that the first reading data is at the address=0 (x=0) of the memory number #1, then the next reading data is at the address=0 of the memory number #5 because x+4=4, and the further next reading data is at the address=1 of the memory number #4 because x+8=8. What is apparent from such repetition is that, when the five-point data are continuously read in the stride=4, the reading-destination memories are all different from others. Everywhere the head coordinates are shifted, the reading-destination memories are all different from others because other reading coordinates are likewise shifted. This is a property which can be obtained when the number of memories and the stride are mutually in the coprime relation.

In the example illustrated in FIG. 15, it can be confirmed that the reading-destination memories are all different from others similarly in other strides except for the stride=5 in which the number of memories and the stride are not in the coprime relation. This is also established even when the stride is 8 or more (except for a case where the stride is a multiple of 5). As just described, to make all the reading-destination memories different from others is the reason why the stride of the reading points and the number of memories should be set to be in the coprime relation. It is possible to have the same effect even when this property is expanded to a two-dimensional arrangement. Hereinafter, a concrete example will be described.

Figure 5A:
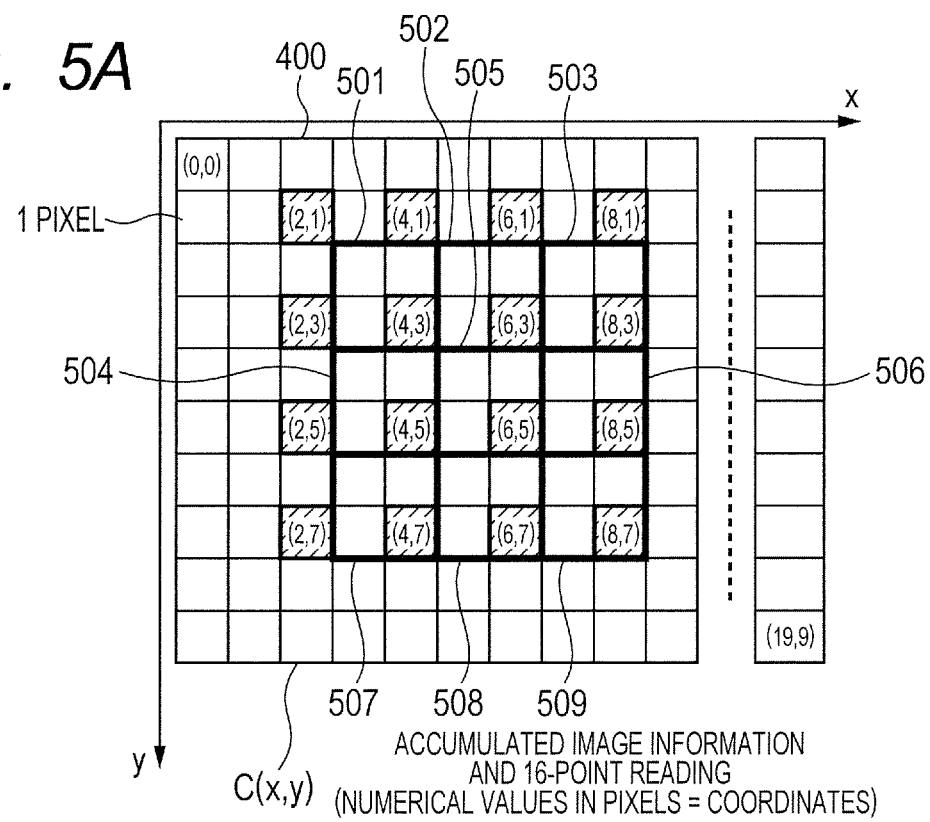
FIGS. 5A and 5B are diagrams for describing an example that five memories are allocated to each of x-axis and y-axis dimensions.
Figure 5B:
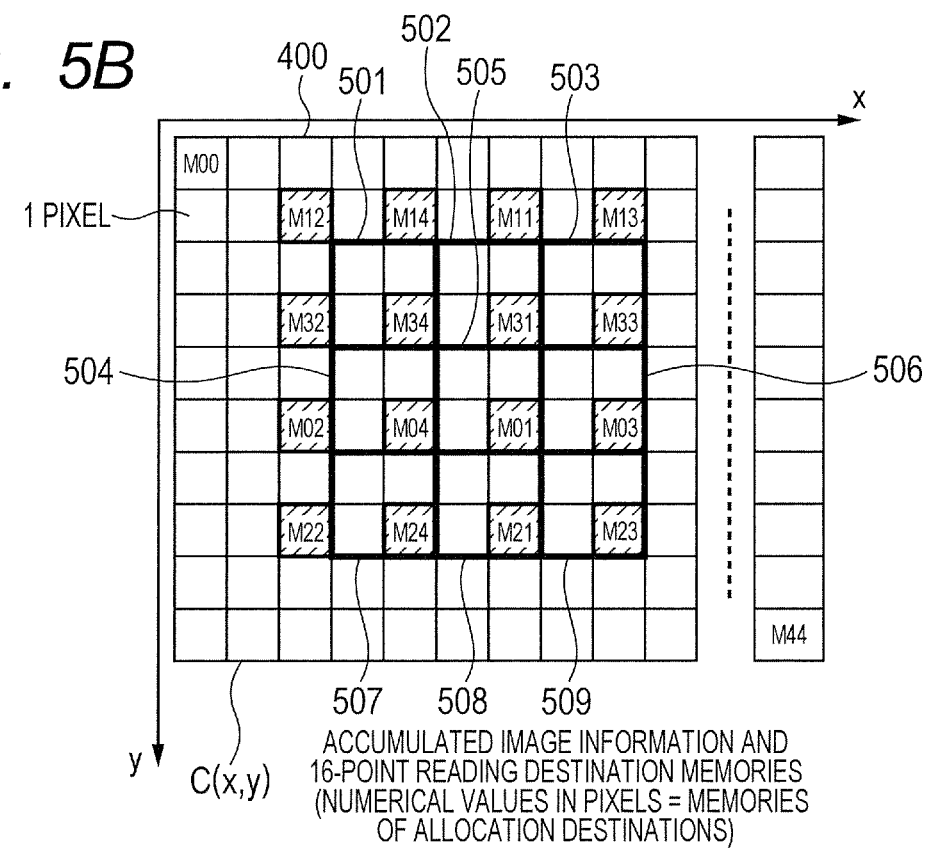

FIGS. 5A and 5B are diagrams for describing an example that the five memories are allocated to each of the x-axis dimension and the y-axis dimension. Here, reading of the 3×3 blocks as illustrated in FIG. 13 is performed from these memories. FIG. 5A shows the example that the sum totals of the respective 3×3 blocks (501 to 509) each having the width=2 and the height=2 are obtained. In this example, the reading points are the 16 points (indicated by the meshed pixels), and the reading of the 16 points is started from the upper left coordinates (2, 1). In the reading, the stride in each of the vertical and horizontal directions is 2, and this stride and the number of memories in each dimensional direction are in the coprime relation.

FIG. 5B shows the relation of the accumulated image information and the memory to which each pixel is allocated. More specifically, it is shown that the pixel of the coordinates (0, 0) is allocated to the memory M00. Further, FIG. 5B shows the memories ($Mp_2p_1$) allocated to the respective coordinates of the reading 16 points. It can be understood from FIG. 5B that all the reading destinations of the 16 points respectively indicate the different memories. This is also the same for other strides. Namely, it is possible for other strides to make all the reading destinations of the 16 points different from others even if the reading is started from anywhere, under the condition that the strides in the x and y directions are the strides other than the strides being multiples of 5.

Next, the block reading condition for performing the parallel reading will be represented by expressions. Namely, it is assumed that the number of blocks in the x direction is $B_1$, the number of blocks in the y direction is $B_2$, and the $B_1 \times B_2$ blocks are provided. Further, when the shape of each block is defined with the width b_width and the height b_height, the conditional expressions are represented by the following expressions (10) and (11).

$$b\_width \neq P_1 \times n \quad (10)$$

$$b\_height \neq P_2 \times m \quad (11)$$

Here, $P_1$ and $P_2$ are prime numbers, and n and m are integers equal to or higher than 1.

Next, the learning will be described. In the present embodiment, the condition for the parallel reading has been described. Then, a learning method for satisfying the above condition will be described hereinafter. The learning has been widely used as a method of determining a standard for identifying in the pattern identifying process whether or not the target included in the image is the detection pattern. In the present embodiment, the parameter determined by the learning is called the dictionary data.

In the learning, a predetermined parameter is derived from each of a plurality of sample images for which it has been known that the predetermined detection pattern has been included and a plurality of sample images for which it has been known that the predetermined detection pattern has not been included, and the derived predetermined parameters are recorded. Here, the predetermined parameter includes derivation of the position and the size of the local area (i.e., the block in the present embodiment).

In an example of the learning method, all the local areas in each sample image are evaluated by the learning, and the parameter of the local area is determined. In the present embodiment, when the local area is evaluated in the learning, the determination is performed by adding the condition of the above parallel reading. More specifically, only the target having the width and the height respectively conforming to the above expressions (10) and (11) is extracted from the local area group conventionally evaluated in each sample image, and then the evaluation and the determination are performed in the learning by using the extracted local area group.

Although the example of the learning has been described as above, the present embodiment is not limited by the method of the learning itself. Namely, it is important to incorporate the condition in the learning so that the expressions (10) and (11) are established. In any case, all the widths and the heights of the local areas of the dictionary data learned by the above method respectively conform to the conditional expressions (10) and (11). As a result, it is possible to always perform the parallel reading by the memory access controlling unit 114.

Figure 13:
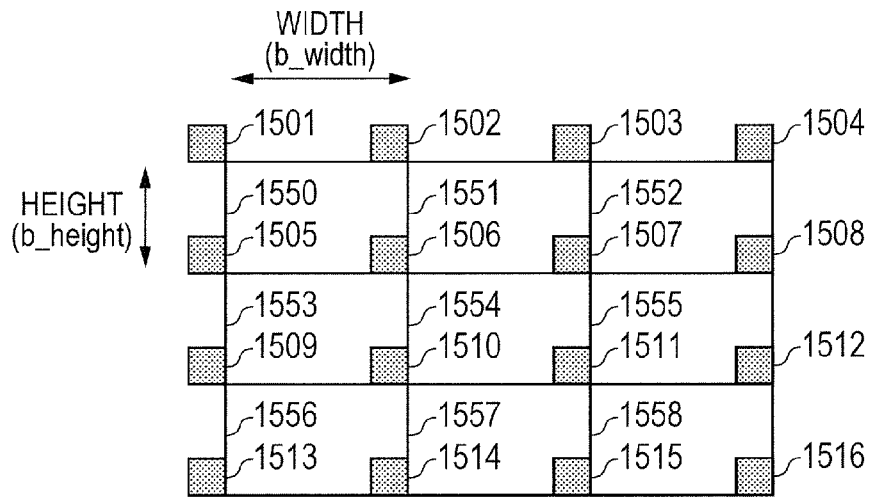
FIG. 13 is a diagram for describing reading of 3×3 blocks for feature quantity calculation.

As just described, the accumulated image information is allocated to the memory configuration of FIG. 14 in units of pixels, and the case where the reading is unbalanced is constrained by the learning, whereby it is possible to read the pixels illustrated in FIG. 13 in parallel. Moreover, with respect to the case where the reading is unbalanced, it is possible to only eliminate the multiple of the number of memories allocated to each dimension by the constraint of the shape (width, height) of the block.

Second Embodiment

The method of allocating the accumulated image information to the memories of the prime number respectively in the x direction and the y direction has been described in the first embodiment. In a second embodiment, in order to suppress the number of memories to be used, there is a method of interleaving the x-direction accumulated image information to the memories of the prime number and reading the 16 points of FIG. 13 while changing the phase according to the position in the y direction. In the second embodiment, it is shown that the method of changing the phase is effective not only to the 16-point reading of FIG. 13 but also to the basic four-point reading of the rectangular area. In any case, since the description of the present embodiment overlaps the description of the first embodiment, only the points different from the first embodiment will be described in the present embodiment.

The constitution of the pattern identifying apparatus in the present embodiment is the same as that in the first embodiment. That is, only the points different from the first embodiment are the parameters of the memory configuration and the process of the allocation writing processing unit 113. In the present embodiment, the parameters of the memory configuration are assumed as $P_1=5$ and $P_2=1$, and the allocation writing processing unit 113 performs a process of changing the phase according to the y direction.

Subsequently, the memory allocation based on a change of the phase and its effect will be described with reference to FIGS. 6A to 6F. More specifically, FIGS. 6A to 6C indicate the example that the accumulated image information is allocated by the method in the first embodiment, and FIGS. 6D to 6F indicate an example that the accumulated image information is allocated to the memory by changing the phase according to the position in the y direction.

FIG. 6A shows the example that the accumulated image information 400 is allocated to the memories in $P_1=5$ and $P_2=1$. Here, a pixel 601 is allocated to the memory M00, subsequent pixels are sequentially allocated to the subsequent memories, and then a pixel 602 is allocated to the memory M04. Further, a next pixel 603 is allocated to the memory M00, and such allocation is repeatedly performed until the right end on the drawing. Subsequently, a head pixel 604 in the next row is allocated to the memory M00 in the same manner as that in the first row.

FIG. 6D shows the example that the accumulated image information 400 is allocated to the memories in $P_1=5$ and $P_2=1$ while changing the phase according to the position in the y direction. Namely, although the pixel in the first row are allocated in the same manner as that shown in FIG. 6A, a head pixel 605 in the second row is allocated to the memory M02. Namely, it can be understood that, unlike FIG. 6A, the memory to which the pixel is allocated is shifted by +1 every time the allocation is advanced by one row in the y direction. Namely, the change of the phase in the present embodiment is equivalent to such shift.

Subsequently, with respect to the expressions of the memory M0$p_1$ ($p_2=0$) and "address", the memory number $p_1$ for storing the pixel value of the coordinates (x, y) is represented by the following expression (12) when a change quantity of the phase is given as S.

$$p_1=(y\times S+x)\%P_1 \tag{12}$$

Here, % indicates a residue (modulo arithmetic).

Subsequently, when the width of the accumulated image information is given as "width", then "address" is represented by the following expression (13).

$$\text{address}=(\text{width}/P_1)\times y+x/P_1 \tag{13}$$

Then, the 16-point reading and the 4-point reading will be described with reference to the two patterns shown in FIGS. 6A and 6D, respectively. First, the 16-point reading is shown in FIGS. 6B and 6E. In the example of the 16-point reading shown in FIGS. 6B and 6E, since the four points of each row can be read in parallel, it is possible to perform the 16-point reading by performing the 4-point reading four times. As described in the first embodiment, this reading can be achieved because, in each row, the number of memories and the stride are mutually in the coprime relation.

Next, the 4-point reading is shown in FIGS. 6C and 6F. The 4-point reading is highly different between the example shown in FIG. 6C and the example shown in FIG. 6F. Namely, in FIG. 6C, the parallel reading of the four vertexes of a rectangular area 610 can be performed in the x direction. However, it can be understood that accessing is necessary two times in the y direction because of the same memory in this direction. This is similar to a rectangular area of any position and of any shape. On the other hand, in FIG. 6F, it can be understood that, since the phase has been changed, the parallel reading of the four vertexes of a rectangular area 611 can be performed. However, since there is a case where the opposite angles conform to each other, it is not always possible to perform the parallel reading in all the cases.

Next, the conditions for the parallel reading will be described using the expressions. Here, it is assumed that the width of the rectangular area is ra_width, the height thereof is ra_height, the number of memories is $P_1$, and the change quantity of the phase is S ($0<S<P_1$, S=1 in the example of FIG. 6D). To eliminate the case where the multiple number of $P_1$ the points of the opposite angles of the rectangular area conform to each other, the following expressions (14) to (17) are defined.

$$ra\_width \neq P_1 \times n \quad (14)$$

$$ra\_height \neq P_1 \times m \quad (15)$$

Here, $P_1$ is a prime number, and n and m are integers equal to or higher than 1.

$$(S \times ra\_height + ra\_width) \% P_1 \neq 0 \quad (16)$$

$$(S \times ra\_height - ra\_width) \% P_1 \neq 0 \quad (17)$$

Here, % indicates a residue (modulo arithmetic).

Then, when the combination of ra_width and ra_height satisfying the four conditions of the expressions (14) to (17) is used in the learning, the parallel reading can be achieved.

Subsequently, relation of the number of shapes (combinations of ra_width and ra_height) usable in the learning, ra_width, ra_height and $P_1$ and relation of the shape usable in the learning and S will be described as concrete examples. If it is assumed that each of the ranges of the values of ra_width and ra_height is set to be 1 or more and 5 or less, 25 combinations are obtained. In case of $P_1$=5 and S=1, there are seven shapes which satisfy the conditions of the expressions (14) to (17), and this equivalent to 28% in regard to the total 25 shapes. In another case, in case of $P_1$=7 and S=1 by increasing the number of memories, there are 16 shapes which satisfy the conditions of the expressions (14) to (17), and this equivalent to 64% in regard to the total 25 shapes, whereby it can be understood that the restriction is eased. That is, it can be understood that the restriction of the shape can be eased if the optimum $P_1$ is determined in conformity with the ranges of the values of ra_width and ra_height.

Next, the relation of the shape usable in the learning and S will be described. The shape usable in the learning is changed according to the value of S. In case of $P_1$=5 and S=1, the four points of the rectangular area of 1×1 (ra_width×ra_height) cannot be read in parallel. However, these points can be read in parallel in case of S=2. On the other hand, in case of $P_1$=5 and S=2, the four points of the rectangular area of 3×4 cannot be read in parallel. However, these points can be read in parallel in case of S=1. It can be understood that, when the shape intended to be used in the learning is determined, the optimum S can be determined in consideration of the determined shape.

In the above embodiments, the method of interleaving the memories of the prime number only in the x direction and changing the phases according to the positions in the y direction so as to suppress the number of memories has been described. Thus, it can be understood that, in the 16-point reading of FIG. 13 and the 4-point reading of the rectangular area, this method enables the high-efficiency reading.

Third Embodiment

In the first and second embodiments, the information of the two-dimensional arrangement called the accumulated image information has been described by way of example. In a third embodiment, a method to be applied to one-dimensional information will be described. In the present embodiment, data of a one-dimensional arrangement is input, and the relevant input data is called one-dimensional input information. Further, information in which the one-dimensional input information has been accumulated is called one-dimensional accumulated information.

Figure 10:
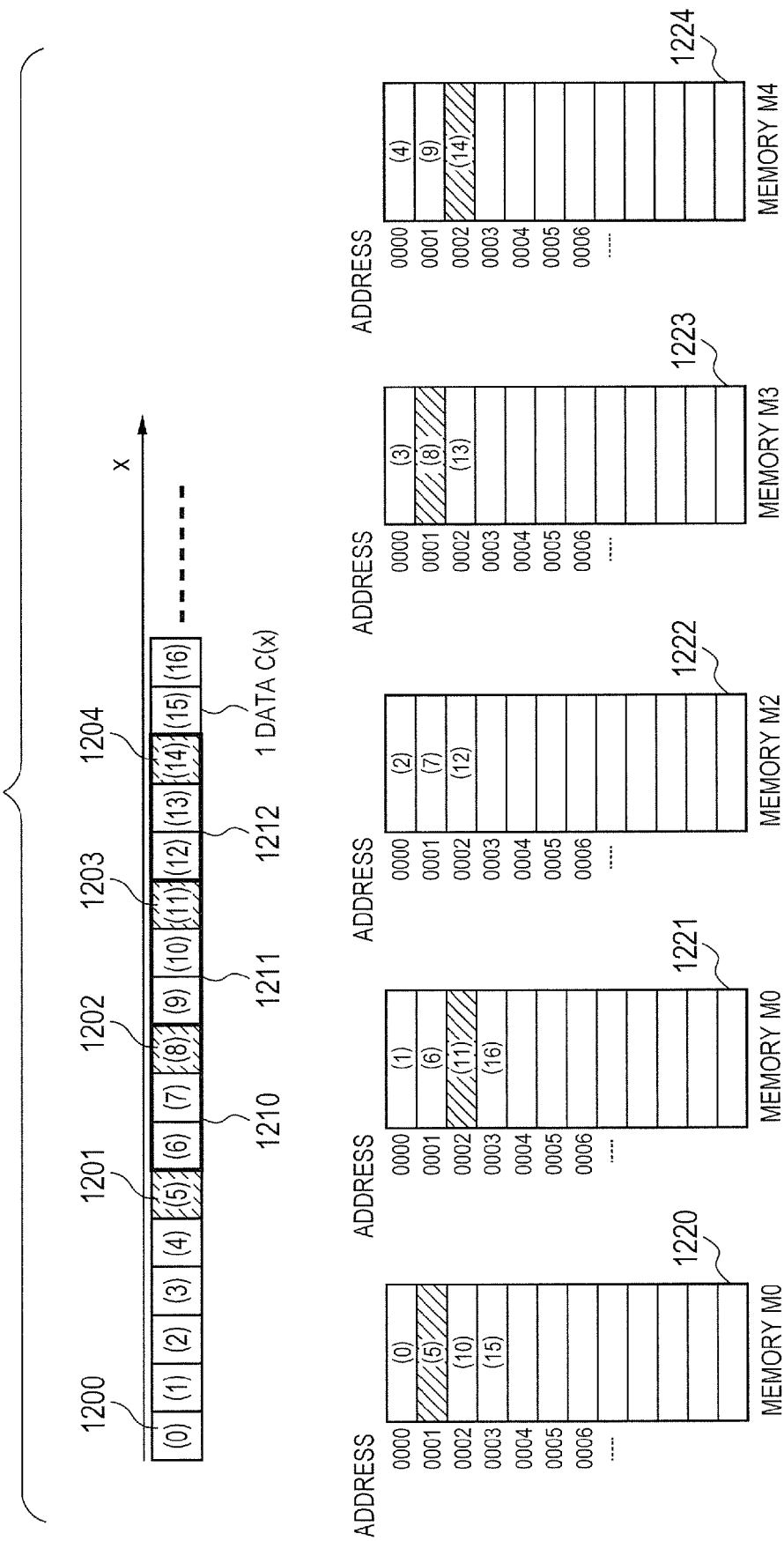
FIG. 10 is a diagram illustrating accumulated information of a one-dimensional arrangement according to a third embodiment.

FIG. 10 is a diagram illustrating the accumulated information of the one-dimensional arrangement according to the present embodiment. In FIG. 10, the leftmost data is set as the start point, the values of the data are accumulated in the x direction, and thus obtained information is called one-dimensional accumulated information 1200. In the illustrated data, the numerical values in the parentheses indicate the respective coordinates in the x direction.

Although the constitution of the pattern identifying apparatus in the present embodiment is basically the same as that in the first embodiment, the point that the number of memories is five is different. Further, the method of allocating the information to the memories and the parallel reading condition in the third embodiment are different from those in the first embodiment. Hereinafter, such differences will be described.

First, the method of allocating the one-dimensional accumulated information to the memories will be described. In this method, the value of the coordinate (x) of the one-dimensional accumulated information is C(x), the number of memories to which the information is allocated is $P_1$, and $P_1$ is a prime number. Further, the memory number is $p_1$, and the memory is indicated by $Mp_1$. Then, the storing destination of C(x) is represented by the following expression (18).

$$Mp_1[\text{address}] = C(x) \quad (18)$$

Further, the memory number $p_1$ to which the pixel value of the coordinate (x) is stored is represented by the following expression (19).

$$p_1 = x \% P_1 \quad (19)$$

Here, % indicates a residue.

Further, "address" of the memory $Mp_1$ at the storing destination is represented by the following expression (20).

$$\text{address} = x/P_1 \quad (20)$$

Here, in the above division, the value after the decimal point is truncated.

The above is the expressions for allocating the one-dimensional accumulated information to the memories according to a predetermined rule. In the present embodiment, as illustrated in FIG. 10, in case of $P_1$=5, the information is stored in memories M0 (1220) to M4 (1224). In account with the above, the one-dimensional accumulated information 1200 of each coordinate is allocated. For example, the memory to which the value C(3) is stored is the memory M1 from the expression (19). Further, the address of the storing destination is "address"=1 from the expression (20). As a result, the expression (18) is represented as M1[1]=C(3), and the value C(3) is stored in "address"=1 of the memory M1. By such calculations, the one-dimensional accumulated information 1200 is stored in M0 (1220) to M4 (1224) illustrated in FIG. 10.

Subsequently, the method of reading the four points at certain intervals will be described. In the one-dimensional accumulated information, a linear section 1210 (hereinafter, called a local piecewise in the one-dimensional accumulated information) corresponds to the local area described in the first embodiment. In this case, an example that the sum total of three continuous local piecewises 1210, 1211 and 1212 is obtained will be described.

First, the method of calculating the sum total of one local piecewise 1210 will be described. When it is assumed that the coordinates of both ends A and B of the local piecewise 1210 are $x_0$ and $x_1$, the positions A and B are respectively represented by the following expression (21).

$$A: (x_0 - 1)$$

$$B: (x_1) \quad (21)$$

Then, the accumulated information values of the positions A and B are read, and a sum total value $S_{ld}$ of the elements in the local piecewise 1210 of the one-dimensional input information is calculated by the following expression (22).

$$S_{ld}=B-A \quad (22)$$

From the above, it is necessary to read the four points of data 1201 to 1204 in order to obtain the sum total of the three continuous local piecewises 1210, 1211 and 1212. In this case, it can be understood that each of the intervals of these data is "3", the number of memory allocations is "5", and they are in the coprime relation. Consequently, as already described in the first embodiment, the reading-destination memories of the continuous four points are different from others. In FIG. 10, it can be understood that the data of the meshed continuous four points are respectively separated in the memories M0, M1, M3 and M4.

Next, the conditional expression of enabling the parallel reading will be described. That is, when the number of allocations to the memories is defined as $P_1$ and the length of the local piecewise is defined as la_length, the conditional expression derived according to the allocation rule of the present embodiment is represented by the following expression (23).

$$la\_length \ne P_1 \times n \quad (23)$$

Here, n is an integer equal to or higher than 1.

However, the number of times of continuous readings of the certain intervals enabling the parallel reading is two or more and $P_1$ or less. Then, it is possible to perform the parallel reading by performing the learning so as to have la_length and the number of continuous readings satisfying the above conditional expression (23).

Fourth Embodiment

Next, in a fourth embodiment, a method to be applied to three-dimensional information will be described by way of example. In the present embodiment, data of a three-dimensional arrangement is input, and the relevant input data is called three-dimensional input information. Here, the three-dimensional input information includes, e.g., moving image information which is obtained by adding a one-dimensional time axis to a two-dimensional image. Incidentally, information which is obtained by accumulating three-dimensional input information is called three-dimensional accumulated information.

Figure 11:
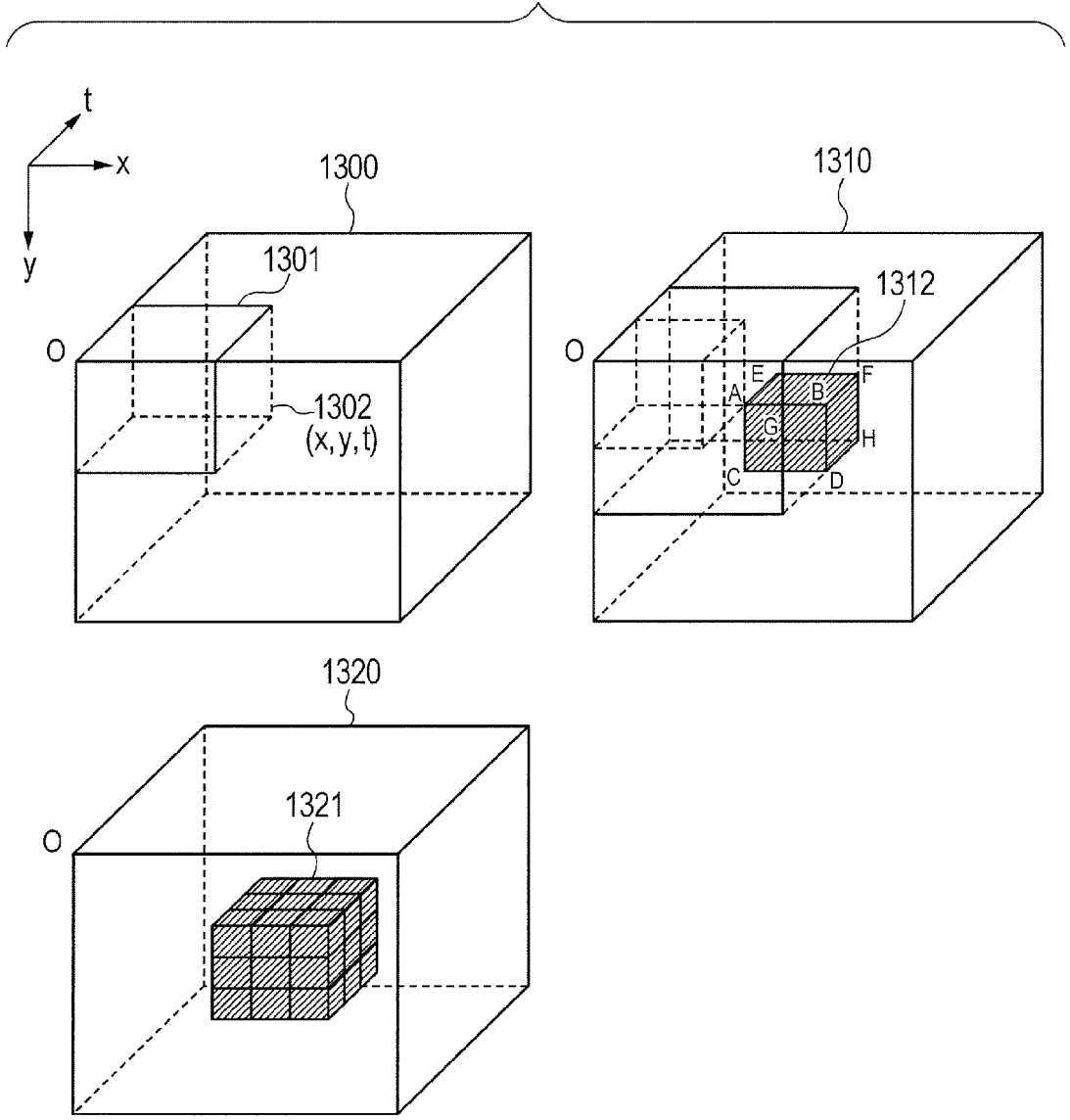
FIG. 11 is a diagram illustrating accumulated information of a three-dimensional arrangement according to a fourth embodiment.

FIG. 11 is a diagram illustrating accumulated information of a three-dimensional arrangement according to the present embodiment. In FIG. 11, an origin O of three-dimensional input information 1300 is set as a start point. Thus, three-dimensional accumulated information 1310 is obtained by accumulating values from the start point in the x, y and t directions respectively. For example, the value of a point 1302 at the coordinates (x, y, t) in the three-dimensional accumulated information 1310 is the sum total value of data included in a cuboid 1301 having the origin O and the point 1302 as the opposite angle. In the present embodiment, the cuboid is considered as the moving information, and the x direction, the y direction and the t direction are defined as the width, the height and the time respectively. In any case, since the t direction is defined as the time axis here, a z direction may be defined as a depth if a three-dimensional space is considered.

The constitution of the pattern identifying apparatus in the present embodiment is the same as that in the first embodiment, but is different from the first embodiment in the point that the number of memories is 125. This is because the information is allocated to five memories in each dimension, that is, the total 125 memories of 5×5×5 are provided. Further, the method of allocating the information to the memories and the parallel reading condition in the fourth embodiment are different from those in the first embodiment. Hereinafter, such differences will be described.

First, the method of allocating the tree-dimensional accumulated information to the memories will be described. Here, the values of the coordinates (x, y, t) of the three-dimensional accumulated information are represented by C(x, y, t). Further, it is assumed that the number of allocations in the x direction is $P_1$, the number of allocations in the y direction is $P_2$, and the number of allocations in the t direction is $P_3$. Here, $P_1$, $P_2$ and $P_3$ are prime numbers. Further, it is assumed that the total number of memories to which the information is allocated is $P_1 \times P_2 \times P_3$. Further, each memory is indicated by $Mp_3p_2p_1$. Here, $p_1$ indicates the memory number in the x direction, $p_2$ indicates the memory number in the y direction, and $p_3$ indicates the memory number in the t direction. Then, the storing destination of the coordinate value C(x, y, t) is represented by the following expression (24).

$$Mp_3p_2p_1[address]=C(x,y,t) \quad (24)$$

Further, the memory numbers $p_1$, $p_2$ and $p_3$ of the memories to which the pixel values of the coordinates (x, y, t) are respectively stored are respectively represented by the following expressions (25) and (27).

$$p_1 = x\%P_1 \quad (25)$$

$$p_2 = y\%P_2 \quad (26)$$

$$p_3 = t\%P_3 \quad (27)$$

Here, % indicates a residue.

Further, when it is assumed that the width and the height of the three-dimensional accumulated information are "width" and "height" respectively, "address" of the memory $Mp_3p_2p_1$ at the storing destination is represented by the following expression (28).

$$address=((width/P_1)\times(height/P_2))\times(t/P_3)+(width/P_1)\times(y/P_2)+(x/P_1) \quad (28)$$

Here, in the above division, the value after the decimal point is truncated.

These are the expressions for allocating the three-dimensional accumulated information to the memories according to the predetermined rule. In the present embodiment, in case of $P_1=5$, $P_2=5$ and $P_3=5$, the three-dimensional accumulated information 1310 of the coordinates is stored in memories (M000) to (M555).

Subsequently, reading of a three-dimensional space 1321 of 3×3×3 illustrated in FIG. 11 will be described. The shapes of the respective three-dimensional spaces arranged in 3×3×3 are the same. In the three-dimensional accumulated information, a cuboid space 1312 (hereinafter, called a local space in the three-dimensional accumulated information) corresponds to the local area described in the first embodiment. In this case, an example that the sum totals of the respective 27 local spaces of 3×3×3 are obtained will be described.

First, the method of calculating the sum total of one local space 1312 will be described. When it is assumed that the coordinates of the two points indicating the opposite angle of the local space 1312 are respectively (x, $y_0$, $t_0$) and ($x_1$, $y_1$, $t_1$), the coordinates of A to H are respectively represented by the following expression (29).

$$A: (x_0-1, y_0-1, t_0-1)$$

$$B: (x_1, y_0-1, t_0-1)$$

$C: (x_0-1, y_1, t_0-1)$ $D: (x_1, y_1, t_0-1)$ $E: (x_0-1, y_0-1, t_1)$ $F: (x_1, y_0-1, t_1)$ $G: (x_0-1, y_1, t_1)$ $H: (x_1, y_1, t_1)$ (29)

If A to H are the accumulated information values at the positions indicated by the expression (29), a sum total value $S_{3d}$ of the elements in the local space 1312 of the three-dimensional input information can be calculated by the following expression (30).

$$S_{3d} = H - D - F + B - (G - C - E + A)$$ (30)

From the above, in order to obtain the sum totals of the respective 27 local spaces of 3×3×3, it is necessary to read the total 64 points of 4×4×4 of the local space 1321. In the present embodiment, the reading interval of the data in each dimensional direction and the number of memory allocations are set to be in the coprime relation. Consequently, as already described in the first embodiment, when they are mutually in the coprime relation, the reading-destination memories of the continuous same-interval points are different from others, whereby it is possible to perform the parallel reading.

Next, the condition by which the parallel reading can be performed will be described. The number of allocations to the memories in each dimension is defined as $P_1$, $P_2$ and $P_3$, the width (x direction) of the one local space is defined as la_width, the height (y direction) of the one local space is defined as la_height, and the time (t direction) of the one local space is defined as la_time. respectively. The conditional expressions derived according to the allocation rule of the present embodiment are represented by the following expressions (31) to (33).

$$la\_with \neq P_1 \times l$$ (31)

$$la\_height \neq P_2 \times n$$ (32)

$$la\_time \neq P_3 \times m$$ (33)

Here, each of l, n and m is an integer equal to or higher than 1.

However, the number of times of the continuous readings of the certain intervals enabling the parallel reading is two or more and $P_1$ or less in the x direction, two or more and $P_2$ or less in the y direction, and two or more and $P_3$ or less in the t direction. It is possible to make the reading memories exclusive by satisfying all the above expressions (31) to (33), whereby it is possible to read in parallel the values of the 64 points of the local space 1321. Moreover, if it is possible to satisfy at least one of the expressions (31) to (33), then it is possible to partially read the values of the 64 points of the local space in parallel.

As just described, by defining the allocation rule to the memory and the condition of the parallel reading, and adding them in the learning, it is possible to always read in parallel the accumulated information of the vertex positions of the local space from the plurality of memories, without increasing the total memory size.

Other Embodiments

In the above embodiments, the one- to three-dimensional data have been described. However, it is apparent that the present invention is also applicable even in regard to accumulated information for multidimensional input information exceeding three dimension, when it is considered likewise by using a super cuboid. Further, the method of the second embodiment of allocating the two-dimensional accumulated image information while changing the phase according to the position in the y direction is also applicable to other-dimensional data.

In the above embodiments, the accumulated information is allocated to the plurality of memories, and the shape of the rectangular area is constrained in the learning. Since it is important in the present invention to set the interval of reading the accumulated information and the number of memories to be in the coprime relation, the present invention is not limited to the respective examples as described in the first to fourth embodiments. Here, a case where the number of memories is other than prime numbers will be described. In case of taking the one-dimensional accumulated information for example, when the number of memories to which the accumulated information is allocated is four, the lengths of the local sections being mutually in the coprime relation are 1, 3, 5, 7, 9, . . . . That is, it is apparent to achieve the parallel reading by setting the length of the local section and the number of memories to be in the coprime relation. Also, it is apparent that this is likewise applicable to the two-dimensional accumulated information, the three-dimensional accumulated information, and the multidimensional accumulated information.

In the above embodiments, the memories of which the number is the prime number are exemplarily provided. However, the present invention is also applicable to an apparatus in which the memories of which the number is not a prime number (e.g., six) are provided and the prime-number memories (e.g., five) are selected and actually used from these memories. Further, in the above embodiments, the weak discriminator is exemplarily used in the pattern identifying process. However, the present invention is not limited to this. In practice, various kinds of pattern identifying processes have been proposed, and various kinds of pattern identifying apparatuses have been actually used. In any case, it is apparent that the present invention is also applicable to any pattern identifying process in which the feature quantity is calculated using the accumulated information.

Figure 12:
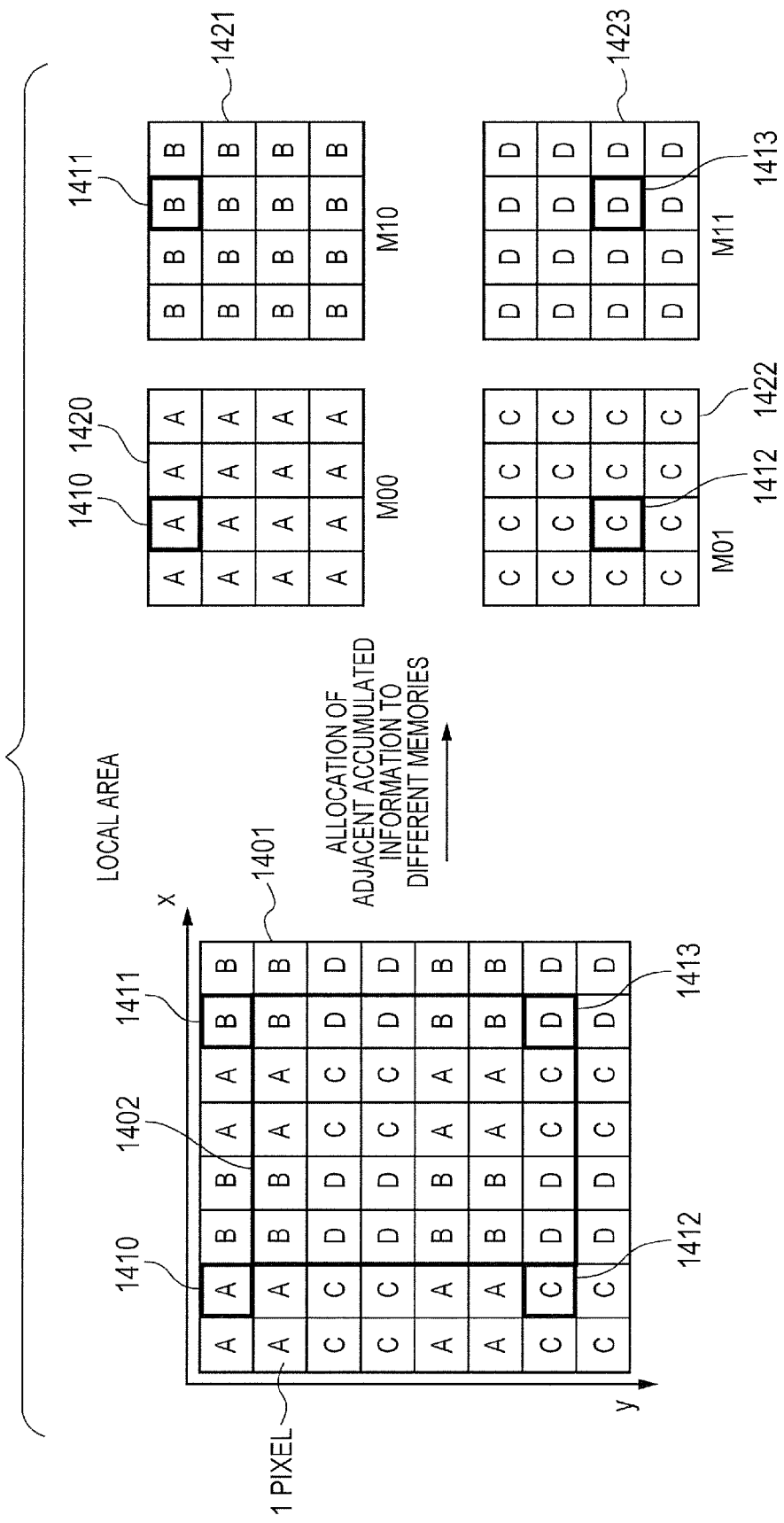
FIG. 12 is a diagram for describing allocation of adjacent accumulated information to memories according to another embodiment.

In the above embodiments, as the method of allocating the data according to the predetermined rule, the method of allocating the data arranged from right to left or up and down respectively to the different memories is used. However, the present invention is not limited to this. For example, adjacent accumulated information may be locally collected and allocated to a different memory in a lump. FIG. 12 shows such an example. In the drawing, it should be noted that A, B, C and D allocated to integration images 1401 before allocation respectively indicate kinds of memories to which the images are allocated. More specifically, the image A is allocated to a memory M00 (1420), the image B is allocated to a memory M10 (1421), the image C is allocated to a memory M01 (1422), and the image D is allocated to a memory M11 (1423). Further, to obtain the sum total of a local area 1402 from the integration images 1401, pixels 1410, 1411, 1412 and 1413 are read. Since the reading-destination memories at this time are separated to all of the memories M00 to M11, it is possible to know that the parallel reading can be performed. As just described, it is possible to allocate the adjacent accumulated information to the memories.

Aspects of the present invention can also be realized by a computer of a system or an apparatus (or devices such as a CPU or an MPU) that reads out and executes a program recorded on a memory device to perform the functions of the above-described embodiments, and by a method, the steps of which are performed by a computer of a system or an apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-198692, filed Sep. 12, 2011, which is hereby incorporated by reference herein in its entirety.

What is claimed is:

1. A pattern identifying apparatus comprising:
a generating unit configured to generate, from input data corresponding to an area, accumulated information corresponding to each position in the area;
a plurality of storing units configured to hold the accumulated information;
a writing unit configured to write the accumulated information corresponding to each position to one of the plurality of storing units according to a predetermined rule concerning the corresponding position;
a parallel reading unit configured to read the accumulated information in parallel from the plurality of storing units;
a feature quantity calculating unit configured to calculate a feature quantity of a local area by using the read accumulated information; and
an identifying unit configured to identify a predetermined pattern by using the plurality of feature quantities,
wherein the number of the storing units allocated to at least one dimension of the area corresponding to the input data and a reading interval of the accumulated information are in a coprime relation.

2. The pattern identifying apparatus according to claim 1, wherein a parameter for calculating the feature quantity of the local area has been subjected to learning so as to be able to read the accumulated information in parallel by the parallel reading unit.

3. The pattern identifying apparatus according to claim 1, wherein the writing unit determines the storing unit to which the accumulated information is to be written, on the basis of coordinates of the position to which the accumulated information corresponds and the number of the storing units allocated to each dimension.

4. The pattern identifying apparatus according to claim 1, wherein
the input data is two-dimensional data,
the accumulated information is created from a two-dimensional arrangement, and
the writing unit allocates the accumulated information to the storing units of $P_1 \times P_2$.

5. The pattern identifying apparatus according to claim 4, wherein $P_1$ is a prime number, and $P_2$ is "1".

6. The pattern identifying apparatus according to claim 5, wherein the allocation of the accumulated information to the plurality of storing units is changed by changing a phase of the dimension corresponding to $P_1$, according to the position of the dimension corresponding to $P_2$.

7. The pattern identifying apparatus according to claim 1, wherein
the input data is one-dimensional data,
the accumulated information is created from a one-dimensional arrangement, and
the writing unit allocates the accumulated information to the storage units of $P_1$.

8. The pattern identifying apparatus according to claim 1, wherein
the input data is three-dimensional data,
the accumulated information is created from a three-dimensional arrangement, and
the writing unit allocates the accumulated information to the storage units of $P_1 \times P_2 \times P_3$.

9. A pattern identifying method comprising:
generating, from input data corresponding to an area, accumulated information corresponding to each position of the area;
writing the accumulated information corresponding to each position to one of a plurality of storing units according to a predetermined rule concerning the corresponding position;
reading the accumulated information in parallel from the plurality of storing units;
calculating a feature quantity of a local area by using the read accumulated information; and
identifying a predetermined pattern by using the plurality of feature quantities,
wherein the number of the storing units allocated to at least one dimension of the area corresponding to the input data and a reading interval of the accumulated information are in a coprime relation.

10. A non-transitory computer-readable storage medium storing a program for causing a computer to perform each step in the pattern identifying method according to claim 9.

* * * * *